(12) United States Patent
Lichnewsky et al.

(10) Patent No.: US 11,227,372 B2
(45) Date of Patent: Jan. 18, 2022

(54) GEOLOGICAL IMAGING AND INVERSION USING OBJECT STORAGE

(71) Applicant: Schlumberger Technology Corporation, Sugar Land, TX (US)

(72) Inventors: Anthony Lichnewsky, Palo Alto, CA (US); Robert Clapp, Sunnyvale, CA (US); Carlos Santieri De Figueiredo Boneti, Saratoga, CA (US); Shashi Menon, Houston, TX (US)

(73) Assignee: Schlumberger Technology Corporation, Sugar Land, TX (US)

( * ) Notice: Subject to any disclaimer, the term of this patent is extended or adjusted under 35 U.S.C. 154(b) by 787 days.

(21) Appl. No.: 16/065,106

(22) PCT Filed: Dec. 30, 2016

(86) PCT No.: PCT/US2016/069526
§ 371 (c)(1),
(2) Date: Jun. 21, 2018

(87) PCT Pub. No.: WO2017/117542
PCT Pub. Date: Jul. 6, 2017

(65) Prior Publication Data
US 2019/0005637 A1 Jan. 3, 2019

Related U.S. Application Data

(60) Provisional application No. 62/273,771, filed on Dec. 31, 2015.

(51) Int. Cl.
*G06T 7/00* (2017.01)
*G01V 1/30* (2006.01)
(Continued)

(52) U.S. Cl.
CPC ............ *G06T 7/0002* (2013.01); *G01S 15/89* (2013.01); *G01V 1/301* (2013.01); *G01V 1/345* (2013.01);
(Continued)

(58) Field of Classification Search
CPC ............ G06F 17/5018; G06F 2217/06; G06F 11/1004; G06F 11/10; G06F 16/51;
(Continued)

(56) References Cited

U.S. PATENT DOCUMENTS 6,021,094 A 2/2000 Ober et al.
9,103,934 B2 8/2015 Kragh et al.
(Continued)

OTHER PUBLICATIONS

Compton, et al., "3D nonlinear stack enhancement: Correlation based stacking," SEG Technical Program Expanded Abstracts, SEG Technical Program Expanded Abstracts 2012, Sep. 1, 2012, pp. 1-5.
(Continued)

*Primary Examiner* — Yuqing Xiao
*Assistant Examiner* — Amie M Ndure

(57) ABSTRACT

Prestack images from the object store are hierarchically combined to generate a hierarchically stacked image. The hierarchically stacked image is generated by combining stacked images that includes a stacked image. The stacked image is generated by combining at least the prestack images. Based at least on the hierarchically stacked image, a quality measure of a prestack image is generated. Prior to deleting at least a subset of the prestack images from the object store and based at least on the quality measure, the prestack images are further combined to generate an enhanced stacked image. The stacked image is substituted using the enhanced stacked image. Subsequent to the substituting and prior to deleting at least the subset of the stacked images from the object store, the stacked images are combined to generate an enhanced hierarchically stacked (Continued)

image. The enhanced stacked image and the enhanced hierarchically stacked image are generated using failure recovery metadata. The enhanced hierarchically stacked image is presented.

19 Claims, 7 Drawing Sheets

(51) Int. Cl.
| | | |
|---|---|---|
| *G01V 1/36* | (2006.01) | |
| *G06F 16/51* | (2019.01) | |
| *G01S 15/89* | (2006.01) | |
| *G01V 1/34* | (2006.01) | |
| *G06F 11/10* | (2006.01) | |

(52) U.S. Cl.
CPC .......... *G01V 1/362* (2013.01); *G06F 11/1004* (2013.01); *G06F 16/51* (2019.01); *G01V 1/306* (2013.01); *G01V 2210/20* (2013.01); *G01V 2210/512* (2013.01); *G01V 2210/62* (2013.01); *G06T 2207/20016* (2013.01); *G06T 2207/20024* (2013.01); *G06T 2207/20212* (2013.01); *G06T 2207/30168* (2013.01); *G06T 2207/30181* (2013.01)

(58) Field of Classification Search
CPC .......... G01V 99/005; G01V 3/12; G01V 7/00; G01V 2210/641; G01V 2210/6161; G01V 2210/6163; G01V 2210/6165; G01V 1/362; G01V 1/306; G01V 2210/62; G01V 2210/512; G01V 2210/20; G01V 1/30; G01V 1/34; G01V 1/36; G01V 1/301; G01V 1/345; G06T 7/00; G06T 7/0002; G06T 2207/20016; G06T 2207/20212; G06T 2207/30168; G06T 2207/20024; G06T 2207/30181; G01S 15/89
See application file for complete search history.

(56) References Cited

U.S. PATENT DOCUMENTS

| | | | |
|---|---|---|---|
| 2005/0265122 A1 | 12/2005 | Grion | |
| 2006/0153005 A1* | 7/2006 | Herwanger | E21B 41/0064 367/38 |
| 2009/0157367 A1* | 6/2009 | Meyer | G01V 99/005 703/10 |
| 2011/0218737 A1* | 9/2011 | Gulati | G06T 15/00 702/16 |
| 2014/0222403 A1* | 8/2014 | Lepage | G01V 99/005 703/6 |
| 2015/0063066 A1 | 3/2015 | Burnett et al. | |
| 2015/0066460 A1* | 3/2015 | Klinger | G01V 99/005 703/2 |
| 2015/0110360 A1 | 4/2015 | Zhao et al. | |
| 2015/0233214 A1* | 8/2015 | Dusterhoft | G01V 99/005 703/10 |
| 2018/0217283 A1* | 8/2018 | Klinger | G01V 1/302 |

OTHER PUBLICATIONS

Whiteside, et al., "Directional Imaging Stack (DIS) for Shot Based Pre-stack Depth Migrations," SEG Technical Program Expanded Abstracts 2012, Sep. 1, 2012, pp. 1-5.
Extended Search Report for the equivalent European patent application 16882760.8 dated Aug. 8, 2019.
Cogan, et al., "Normalization strategies for reverse-time migration," 81st Annual International Meeting, Society of Exploration Geophysicist (SEG), Expanded Abstracts 30, 2011, pp. 3275-3279.
Jiao, et al., "Migration imaging enhancement through optimized alignment of vector image partitions," SEG Annual Meeting, 2014, pp. 3699-3703.
Matson, et al., "Signal Enhancement Using Diversity Shot Stacking for Reverse Time Migration (DeSSeRT)," Society of Exploration Geophysicists (SEG) 2012 Annual Meeting, pp. 1-5.
Xu, et al., "Reverse Time Migration Using Vector Offset Output to Improve Subsalt Imaging—A Case Study at the Walker Ridge GOM," SEG Annual Meeting, 2011, pp. 3269-3274.
International Search Report and Written Opinion for the equivalent International patent application PCT/US201 6/069526 dated Apr. 24, 2017.
International Preliminary Report on Patentability for the equivalent International patent application PCT/US2016/069526 dated Jul. 12, 2018.

* cited by examiner

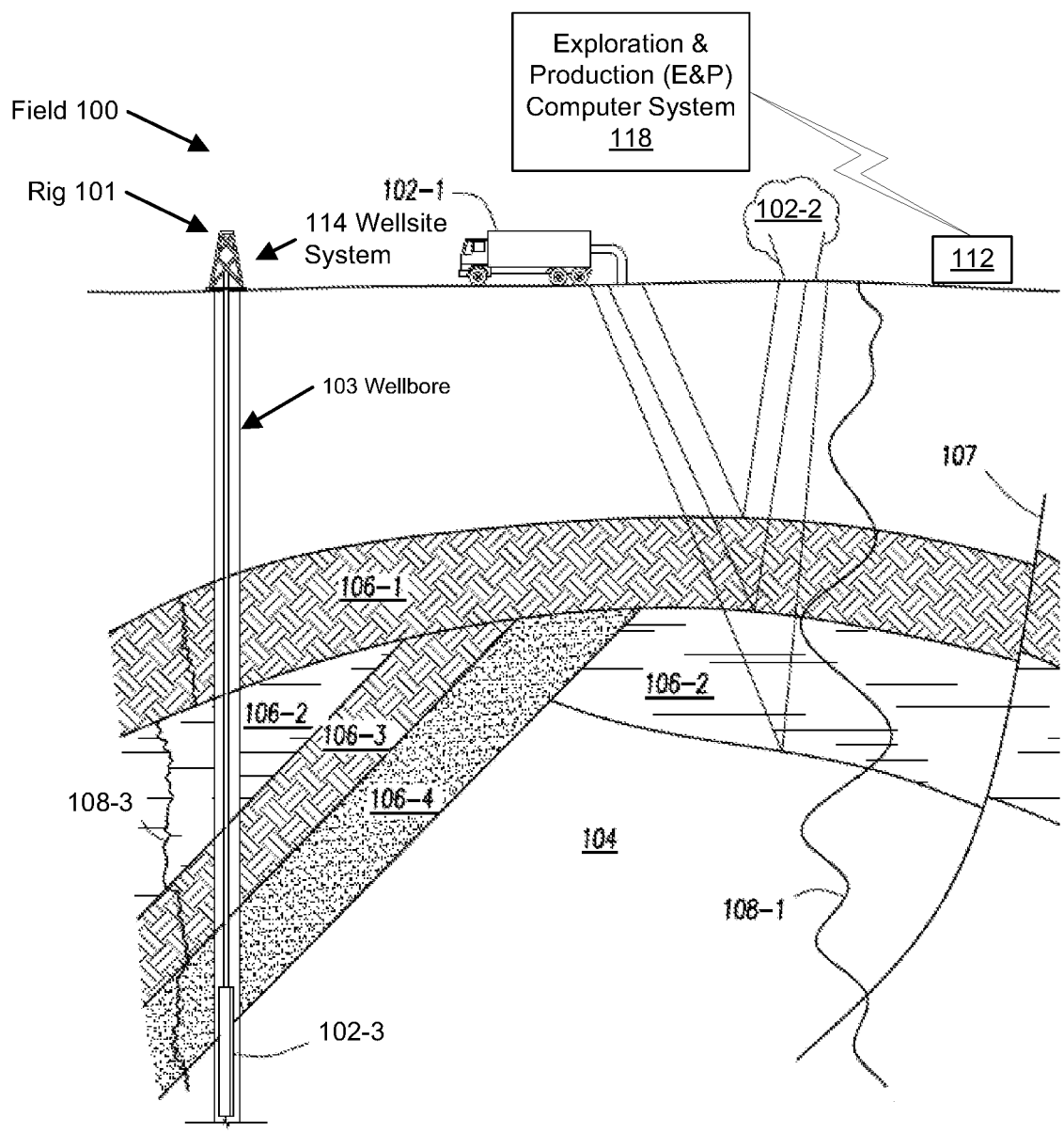
FIG. 1.1

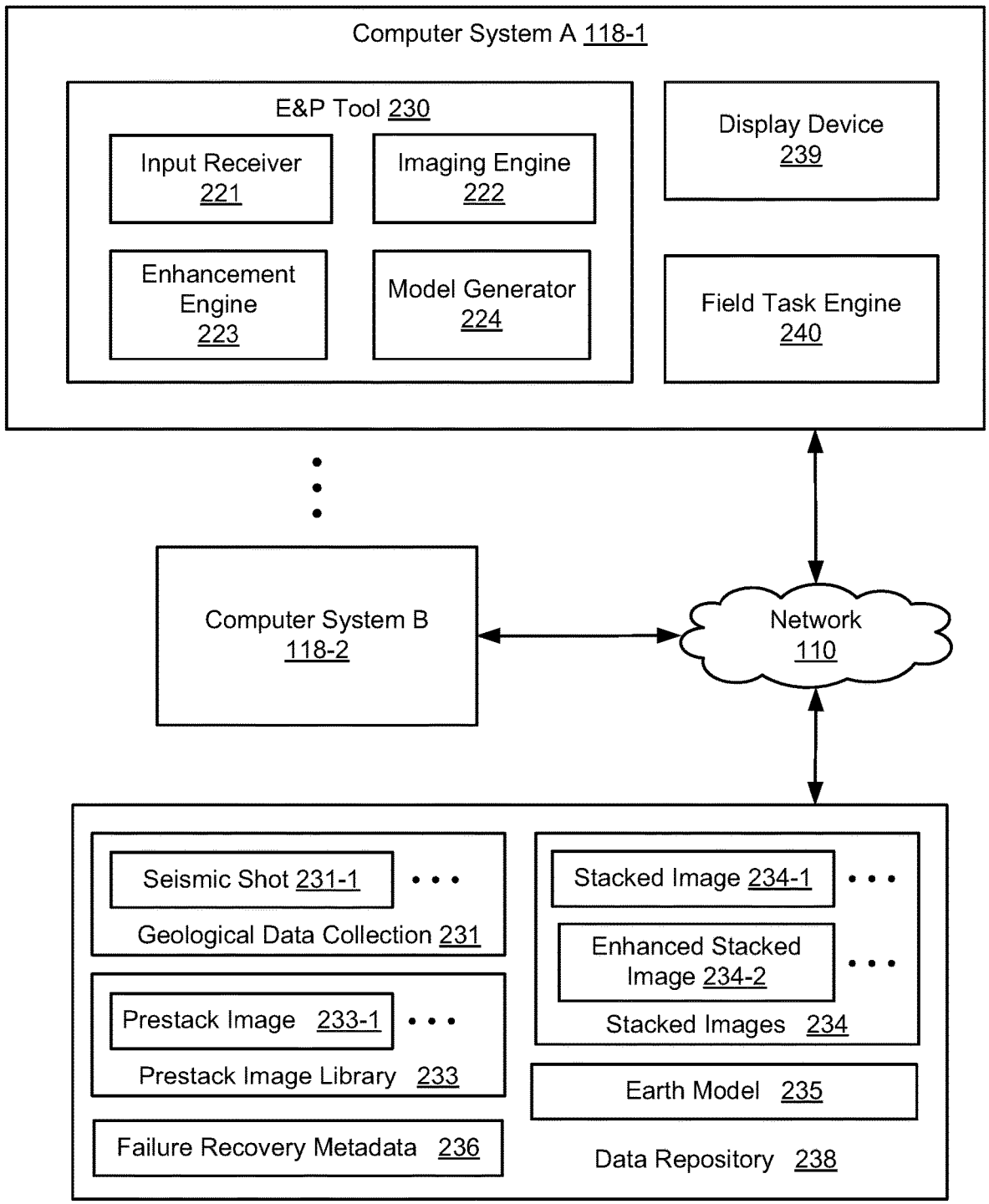
FIG. 1.2

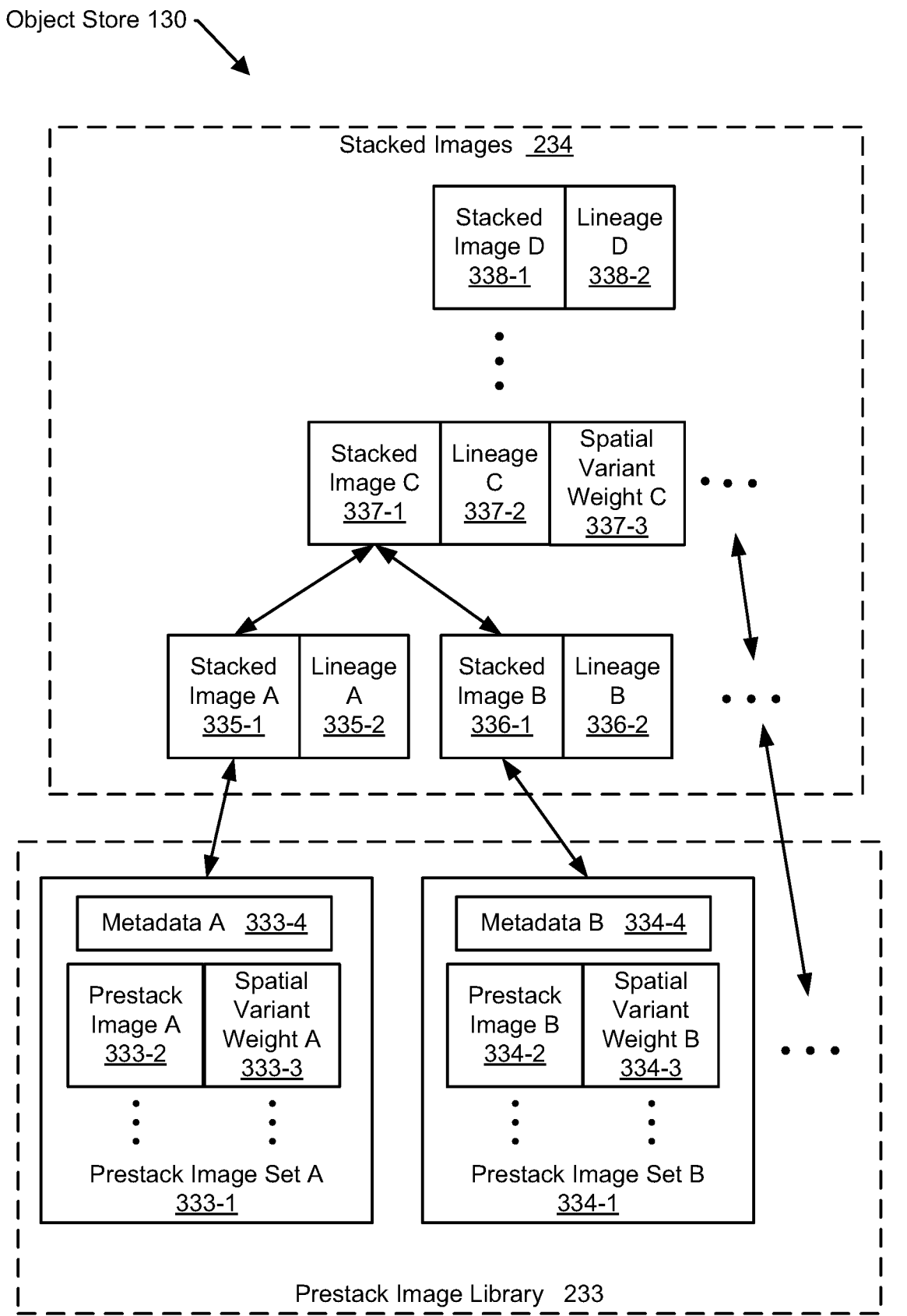
FIG. 1.3

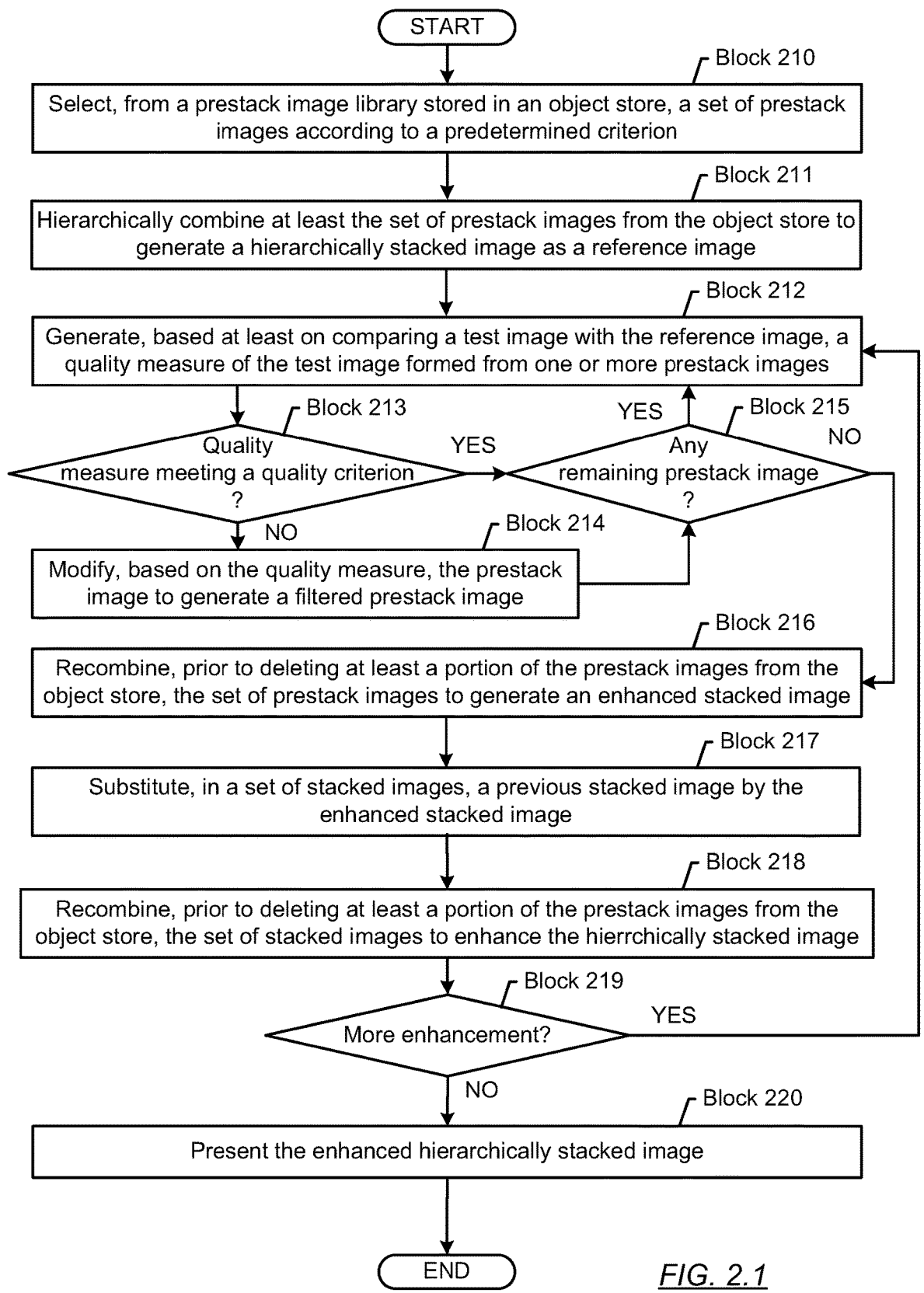
FIG. 2.1

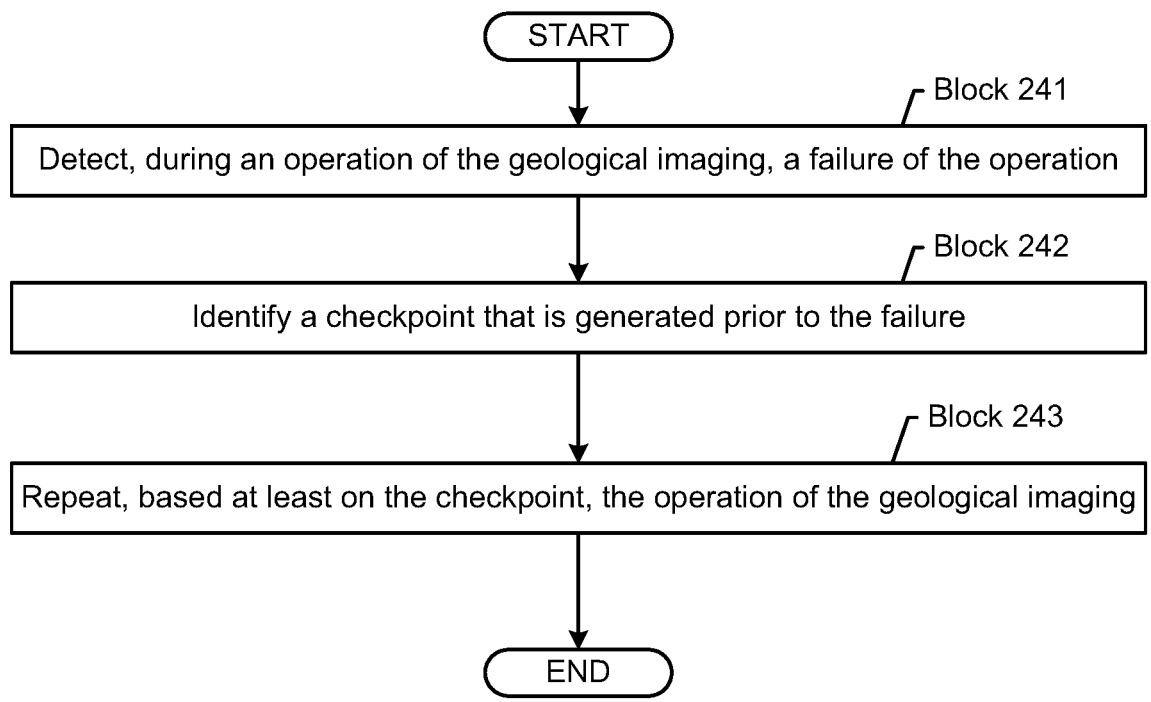
FIG. 2.2

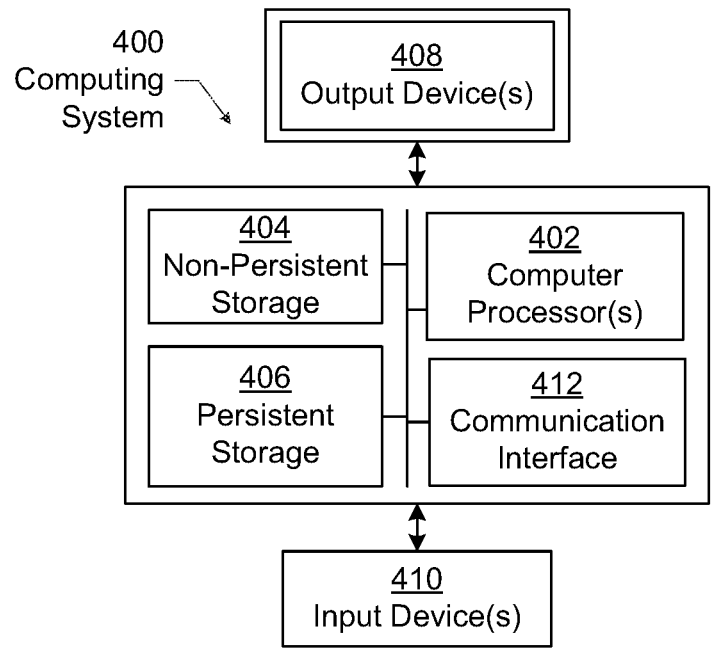
FIG. 4.1
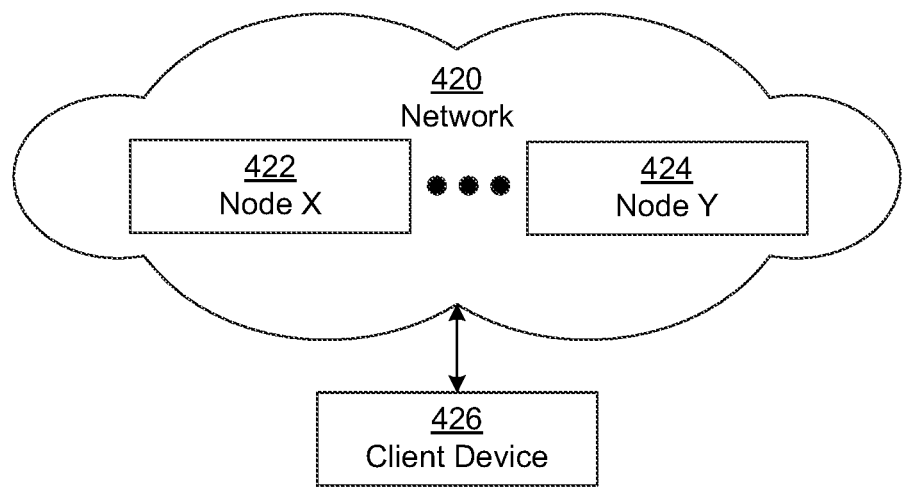
FIG. 4.2

GEOLOGICAL IMAGING AND INVERSION USING OBJECT STORAGE

CROSS REFERENCE TO RELATED APPLICATIONS

This application claims priority to U.S. Patent Application No. 62/273,771 filed Dec. 31, 2015, entitled "STORING GEOLOGICAL IMAGE OR MODEL AS AN OBJECT STORE,"; 09469/329001. U.S. Patent Application No. 62/273,771 is hereby incorporated by reference in its entirety.

BACKGROUND

Advances in data acquisition techniques (e.g., wide azimuth, full azimuth surveys, acquisitions during turns, etc.) and in computer speed and size lead to an increasing amount of geological data collected in the field to be prestack-migrated in the field or in datacenters. The relative slower growth in storage capabilities (e.g., bandwidth, accessibility, capacity) compared to data acquisition and computing capabilities limit the stacking process that accumulates (partial) images. Accordingly, prestack images and intermediate partial sums are often deleted after being stacked to generate the intermediate results of the stacking process. As a result, the amount of post stack analysis possible is constrained without re-computing the original prestack images.

SUMMARY

In general, in one aspect, one or more embodiments relate to geological imaging using an object store. Prestack images from the object store are hierarchically combined to generate a hierarchically stacked image. The hierarchically stacked image is generated by combining stacked images that includes a stacked image. The stacked image is generated by combining at least the prestack images. Based at least on the hierarchically stacked image, a quality measure of a prestack image is generated. Prior to deleting at least a subset of the prestack images from the object store and based at least on the quality measure, the prestack images are further combined to generate an enhanced stacked image. The stacked image is substituted using the enhanced stacked image. Subsequent to the substituting and prior to deleting at least a subset of the stacked images from the object store, the stacked images are combined to generate an enhanced hierarchically stacked image. The enhanced stacked image and the enhanced hierarchically stacked image are generated using failure recovery metadata. In one or more embodiments, the enhanced hierarchically stacked image is presented. In one or more embodiments, an earth model is generated based at least on the enhanced hierarchically stacked image.

Other aspects will be apparent from the following description and the appended claims.

BRIEF DESCRIPTION OF DRAWINGS

FIG. 1.1 is a schematic view, partially in cross-section, of a field in which one or more embodiments of geological imaging and inversion using object storage may be implemented.

FIGS. 1.2 and 1.3 show schematic diagrams of a system in accordance with one or more embodiments.

FIGS. 2.1 and 2.2 show flowcharts in accordance with one or more embodiments.

FIGS. 4.1 and 4.2 show computer systems in accordance with one or more embodiments.

DETAILED DESCRIPTION

Figure 3:
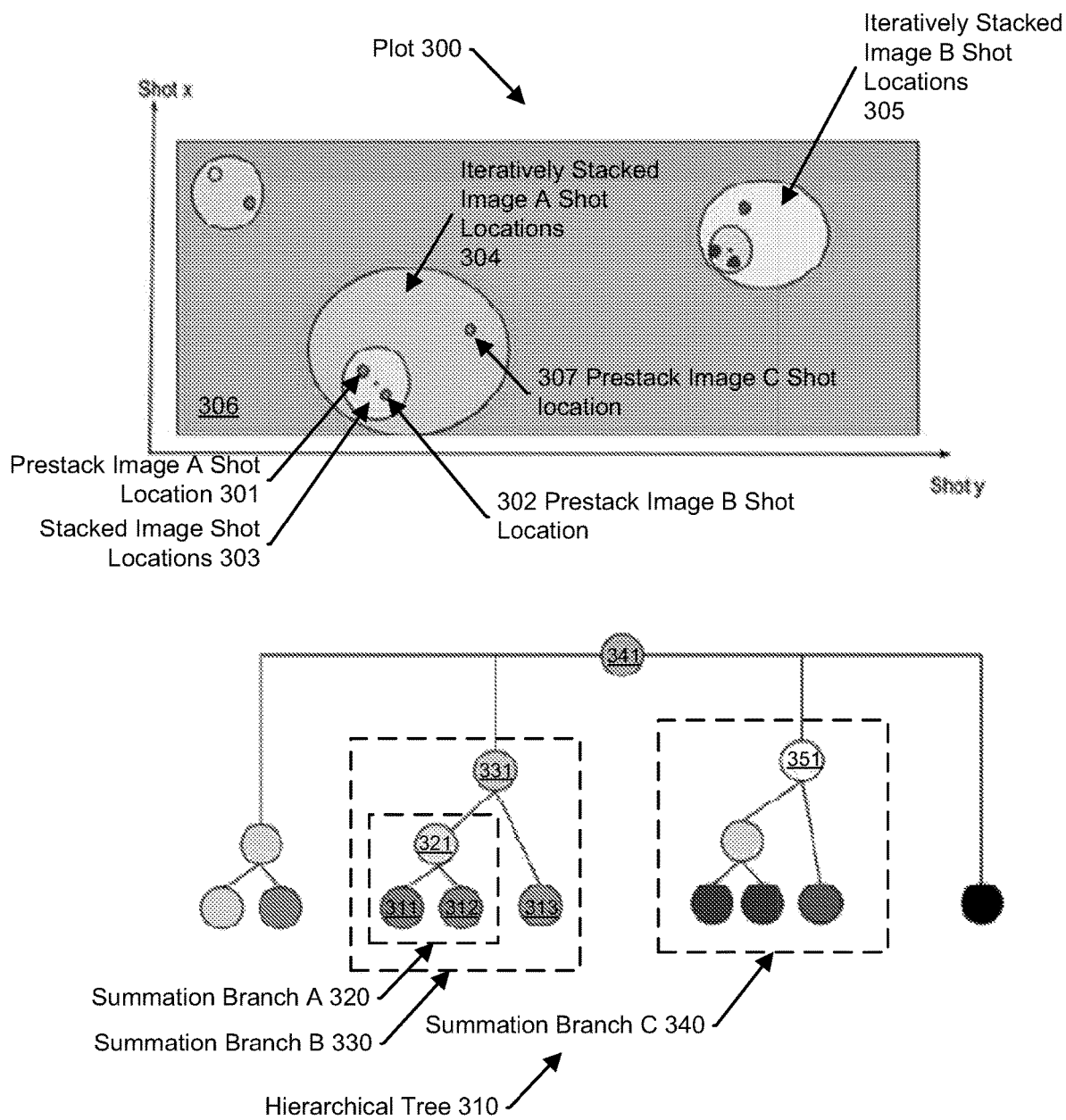
FIG. 3 shows an example in accordance with one or more embodiments.

Specific embodiments will now be described in detail with reference to the accompanying figures. Like elements in the various figures are denoted by like reference numerals.

In the following detailed description of embodiments, numerous specific details are set forth in order to provide a more thorough understanding. However, it will be apparent to one of ordinary skill in the art that one or more embodiments may be practiced without these specific details. In other instances, well-known features have not been described in detail to avoid unnecessarily complicating the description.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

As used throughout this disclosure, "prestack-migration" is the process by which pre-processed geological data collected in the field are analyzed to generate an image of geological characteristics in the subsurface. An example of the prestack-migration includes seismic migration described in detail below. Throughout this disclosure, the term "stacked image" refers to a combined image generated by a weighted and filtered sum—the stacking process—of multiple images from the prestack-migration. The term "prestack image" refers to the initial image resulted from a prestack-migration prior to any stacking process.

In general, embodiments provide a method and system for geological imaging using an object store. In one or more embodiments, an imaging engine hierarchically combines prestack images from the object store to generate a hierarchical tree of stacked images. A stacked image generated by combining at least a set of stacked images may be referred to as a hierarchically stacked image. In one or more embodiments, the hierarchically stacked image is used by an enhancement engine as a reference image to generate quality measures of the prestack images. Based at least on one or more quality measures, the enhancement engine modifies and recombines prestack images to generate an enhanced stacked image prior to deleting at least a subset of the prestack images from the object store. Using the enhanced stacked image, the enhancement engine recombines the previous set of stacked images to generate an enhanced hierarchically stacked image.

In one or more embodiments, the enhanced stacked image and the enhanced hierarchically stacked image are generated using failure recovery metadata. The failure recovery metadata may be stored with an associated data object in the object store, or separately stored in another object associated with the data object. In one or more embodiments, the object store may provide at least some of the failure recovery metadata. In one or more embodiments, an earth model is generated based at least on the enhanced hierarchically stacked image. Subsequent to generating the earth model and/or other final result of the geological imaging, at least a portion of the prestack images may then be deleted from the object store to release the computing and storage resources for performing other workflows.

FIG. 1.1 depicts a schematic view, partially in cross section, of a field (100) in which one or more embodiments of geological imaging and inversion using object storage may be implemented. In one or more embodiments, one or more of the modules and elements shown in FIG. 1.1 may be omitted, repeated, and/or substituted. Accordingly, embodiments of geological imaging and inversion using object storage should not be considered limited to the specific arrangements of modules shown in FIG. 1.1.

As shown in FIG. 1.1, the field (100) includes the subterranean formation (104), data acquisition tools (102-1) and (102-3), wellsite system (114), a surface unit (112), and an exploration and production (E&P) computer system (118). The subterranean formation (104) includes several geological structures, such as a sandstone layer (106-1), a limestone layer (106-2), a shale layer (106-3), a sand layer (106-4), and a fault line (107). One or more of these layers may include hydrocarbon, coal-bed methane with natural gas, and/or other fluids, such as water. Data associated with these geological structures may be gathered as geological data and/or models. In one or more embodiments, data acquisition tools (102-1) and (102-3) are positioned at various locations along the field (100) for collecting data of the subterranean formation (104), referred to as survey operations. In particular, the data acquisition tools are adapted to measure the subterranean formation (104) and detect the characteristics of the geological structures of the subterranean formation (104).

For example, the data acquisition tools (102-1) may include seismic tools, such as a seismic truck equipped with seismic sensors (e.g., geophones) that measure responses from seismic waves sent into the earth. A set of consecutive waves sent during a continuous time duration is referred to as a shot of waves. In particular, multiple shots of compression waves are sent by a number of seismic sources (e.g., seismic source (102-2)) disposed at multiple shot locations (referred to as shot coordinates) throughout the field (100). Sending compression waves from the seismic sources (e.g., seismic source (102-2)) into the earth is referred to as illumination. The regions in the subterranean formation (104) where the compression waves are reflected are referred to as illuminated regions. In contrast, one or more portions of the subterranean formation (104) in between illuminated regions are referred to as illumination gaps. Although the above is discussed with respect to compression waves using a seismic truck, one or more embodiments may be applied to shots of naturally created waves (e.g., via natural geologic processes of the Earth), seismic waves from other drilling sites, or any other origin of a seismic wave.

For each shot of compression waves originated from a particular shot coordinate, the reflected waves are measured at multiple seismic sensor locations (referred to as acquisition coordinates) to form a collection of seismic data referred to as a seismic shot. The geometric combination of shot coordinates and acquisition coordinates is referred to as the acquisition footprint of the seismic shot. The acquisition footprint and additional parameters (e.g., an incidence angle, an energy level, a time duration, an acquisition time, etc. of the compression waves) of the seismic shot are collectively referred to as the gather parameters of the seismic shot. As shown in FIG. 1.1, data plots (108-1) and (108-3) are depicted along the field (100) to demonstrate the data generated by the data acquisition tools. For example, the data plot (108-1) is a part of a seismic shot including time series data of seismic two-way response time. Using seismic migration technique, the data plot (108-1) may be used to generate a prestack seismic image. In another example, the data plot (108-3) is a logging trace, referred to as a well log. Other data may also be collected, such as historical data, analyst user inputs, economic information, and/or other measurement data and other parameters of interest.

As further shown in FIG. 1.1, the wellsite system (114) is associated with a rig (101), a wellbore (103), and other wellsite equipment configured to perform wellbore operations, such as logging, drilling, fracturing, production, or other applicable operations. For example, the wellsite system (114) may be associated with drilling equipment, production equipment, and/or logging equipment to perform drilling operations, production operations, and/or logging operations, respectively. Generally, survey operations and wellbore operations are referred to as field operations of the field (100). In addition, data acquisition tools and wellsite equipment are referred to as field operation equipment. The field operations are performed as directed by a surface unit (112). For example, the field operation equipment may be controlled by a field operation control signal that is sent from the surface unit (112).

In one or more embodiments, the surface unit (112) is operatively coupled to the data acquisition tools (102-1), (102-3), and/or wellsite systems, such as the wellsite system (114). In particular, the surface unit (112) is configured to send commands to the data acquisition tools (102-1), (102-3), and/or the wellsite systems, and to receive data therefrom. In one or more embodiments, surface unit (112) may be located at the wellsite system (114) and/or remote locations. The surface unit (112) may be provided with computer facilities (e.g., an E&P computer system (118)) for receiving, storing, processing, and/or analyzing data from the data acquisition tools (102-1) (102-3), wellsite system (114), and/or other parts of the field (100). The surface unit (112) may also be provided with or have functionality for actuating mechanisms at the field (100). The surface unit (112) may then send command signals to the field (100) in response to data received, stored, processed, and/or analyzed, for example, to control and/or optimize various field operations described above.

In one or more embodiments, the surface unit (112) is communicatively coupled to the E&P computer system (118). In one or more embodiments, the data received by the surface unit (112) may be sent to the E&P computer system (118) for further analysis. Generally, the E&P computer system (118) is configured to analyze, model, control, optimize, or perform management tasks of the aforementioned field operations based on the data provided from the surface unit (112). In one or more embodiments, the E&P computer system (118) is provided with functionality for manipulating and analyzing the data, such as analyzing seismic data to determine geological characteristics in the subterranean formation (104) or performing simulation, planning, and optimization of operations of the wellsite system (114). In one or more embodiments, the result generated by the E&P computer system (118) may be displayed for user viewing using a two dimensional (2D) display, three dimensional (3D) display, or other suitable displays. Although the surface unit (112) is shown as separate from the E&P computer system (118) in FIG. 1.1, in other examples, the surface unit (112) and the E&P computer system (118) may also be combined.

Although FIG. 1.1 shows a field (100) on the land, the field (100) may be an offshore field. In such a scenario, the subterranean formation (104) may be in the sea floor. Further, field data may be gathered from the field (100) that is an offshore field using a variety of offshore techniques for gathering field data.

FIG. 1.2 shows more details of the E&P computer system (118) in which one or more embodiments of geological imaging and inversion using object storage may be implemented. In one or more embodiments, one or more of the modules and elements shown in FIG. 1.2 may be omitted, repeated, and/or substituted. Accordingly, embodiments of geological imaging and inversion using object storage should not be considered limited to the specific arrangements of modules shown in FIG. 1.2.

As shown in FIG. 1.2, the E&P computer system (118) includes computer systems (e.g., computer system A (118-1), computer system B (118-2), etc.) and a data repository (238) that are coupled via one or more computer networks (e.g., network (110)). As non-limiting examples, the computer network(s) (e.g., network (110)) may include wired and/or wireless portions of public and/or private data networks, such as wide area networks (WANs), local area networks (LANs), the Internet, etc. The computer system A (118-1) includes an E&P tool (230), a display device (239), and a field task engine (240) for performing various tasks of the field operation. Although not explicitly shown, the computer system B (118-2) may include similar components of the computer system A (118-1). Intermediate data and resultant results of the systems (e.g., computer system A (118-1), computer system B (118-2), etc.) are stored as content in the data repository (238).

In one or more embodiments, the data repository (238) may include one or more disk drive storage devices, one or more semiconductor storage devices, other suitable computer data storage devices, or combinations thereof. In one or more embodiments, content stored in the data repository (238) may be stored as a data file, a linked list, a data sequence, a database, a graphical representation, any other suitable data structure, or combinations thereof.

In one or more embodiments, content stored in the data repository (238) is stored as data objects, and the data repository (238) is an object store. Specifically, each data object in the object store includes the data itself, associated metadata, and a globally unique identifier (referred to as an object tag). In addition, the object store facilitates failure recovery by maintaining failure recovery metadata (236) for content stored in the object store. In one or more embodiments, the failure recovery metadata (236) is a data item derived from the content stored in the object store to track data integrity and data lineage of the content. For example, the failure recovery metadata (236) may includes the aforementioned object tag. In addition, the failure recovery metadata (236) may include checksum, object lineage, etc. of data objects stored in the data repository (238). For example, the checksum may be computed as a digital sum of data bits of the data object, the lineage may be computed as a total list of underlying elements of the data object. The object store may maintain atomicity information that specifies whether or not write transactions on a data object are complete. Further, the object store may include failure recovery mechanisms by rolling back incomplete write transactions when a failure exists. Thus, writes to data objects are either not performed or successfully performed. In one or more embodiments, the data repository (238) as an object store is based on a cloud storage service in which the data objects are stored in logical pools where the physical storage spans multiple (e.g., hundreds, thousands, or more) servers and locations. For example, the cloud storage service may be accessed through a co-located cloud computer service, a web service application programming interface (API), or by applications that utilize the API, such as a cloud desktop storage, a cloud storage gateway, or web-based content management systems.

In one or more embodiments, the intermediate data and resultant results of the computer systems (e.g., computer system A (118-1), computer system B (118-2), etc.) include the geological data collection (231), prestack image library (233), stacked images (234), and earth model (235). In one or more embodiments, the geological data collection (231) includes a large collection of seismic shots (e.g., seismic shot (231-1)) described in reference to FIG. 1.1 above. For example, hundreds, thousands, tens of thousands, hundreds of thousands, or more seismic shots may exist, at a single point in time, in the geological data collection (231). In one or more embodiments, the seismic shots are stored in association with shot coordinates and acquisition coordinates. For example, within the geological data collection (231), the seismic shot (231-1) may be tagged with the shot coordinates of the seismic source (102-2) and the acquisition coordinates corresponding to the data acquisition tool (102-1) depicted in FIG. 1.1 above.

In one or more embodiments, various geological data processing algorithms are used to turn the geological data collection (231) from time series data into subsurface images and estimations of the subsurface physical composition. In particular, prestack geological data imaging produces individual images for each seismic shot. For example, seismic migration is the process by which seismic events (e.g., reflection) are geometrically re-located in either space or time to the location the event occurred in the subsurface (i.e., the seismic event location) rather than the acquisition coordinates where the waves are measured at the surface. In one or more embodiments, the geological data collection (231) is processed by the seismic migration into the prestack image library (233). Specifically, the prestack image library (233) includes a collection of prestack images, such as the prestack image (233-1). For example, hundreds, thousands, tens of thousands, hundreds of thousands, or more seismic prestack images may exist, at a single point in time, in the prestack image library (233). In particular, the prestack image (233-1) is a 2D or 3D image of the subsurface generated from the seismic shot (231-1) by way of seismic migration. The pixel values of the 2D or 3D image correspond to data (e.g., strength or other measure of the seismic reflection) associated with corresponding seismic event locations. In one or more embodiments, one or more prestack images (e.g., prestack image (233-1)) may be partial images corresponding to disparate illuminated regions. In one or more embodiments, one or more prestack images (e.g., prestack image (233-1)) may include artifacts resulting from less-than-ideal acquisition conditions of the geological data collection (231). For example, the image from a seismic shot (233-1) may include one or more of a coherent noise artifact, an illumination gap artifact, a phase misalignment artifact, an image multiples artifact, etc. potentially due to the aforementioned gather parameters associated with the seismic shot (231-1).

In one or more embodiments, multiple prestack images are combined (e.g., by summing the underlying pixel values) into a stacked image (e.g., stacked image (234-1)) to integrate partial images or to reduce/cancel out the artifacts in the individual prestack images. The combination of prestack images (e.g., prestack image (233-1)) may be performed hierarchically. Further, the quality of a stacked image (e.g., stacked image (234-1)) may be further improved using an image enhancement algorithm to generate an enhanced stacked image (e.g., enhanced stacked image (234-2)). For example, the image enhancement algorithm may be used to remove or further reduce the image artifact contributions from the prestack images (e.g., prestack image (233-1)) into the enhanced stacked image (e.g., enhanced stacked image (234-2)).

In one or more embodiments, the earth model (235) is an analytical model, a structural model, or a volume-based model of the subterranean formation (104). In particular, the earth model (235) includes information describing formation characteristics, such as geological and/or geophysical parameters of the subterranean formation (104). For example, the geological and/or geophysical parameters may be computed from the geological data collection (231) and assigned to grid cells of the earth model (235). In one or more embodiments, the earth model (235) is used to perform simulation, planning, and optimization of exploratory and/or production operations of one or more reservoirs in the field (100) depicted in FIG. 1.1 above.

Although the geological data collection (231), prestack image library (233), and stacked images (234) are described above based on seismic data, the geological data collection (231) may also include other types of geological data from which the prestack image library (233), stacked images (234), and earth model (235) are generated.

In one or more embodiments, the E&P tool (230) includes the input receiver (221), the imaging engine (222), the enhancement engine (223), and the model generator (224). Each of these components of the E&P tool (230) is described below.

In one or more embodiments, the input receiver (221) is configured to obtain the geological data collection (231) for analysis and processing by the imaging engine (222) and the enhancement engine (223). In one or more embodiments, the input receiver (221) obtains the geological data collection (231) from the surface unit (112) depicted in FIG. 1.1 above. For example, the input receiver (221) may obtain seismic shots (e.g., seismic shot (231-1)) or other geological data from the surface unit (112) intermittently, periodically, in response to user activation, or triggered by an event. Accordingly, the intermediate and final results of the imaging engine (222) and the enhancement engine (223) may be generated intermittently, periodically, in response to user activation, or triggered by an event.

In one or more embodiments, the imaging engine (222) is configured to generate the prestack images (e.g., prestack image (233-1)) from the geological data collection (231), e.g., by performing the seismic migration to form the prestack image library (233). In one or more embodiments, the imaging engine (222) is further configured to generate the stacked images (234) by summing selected prestack images from the prestack image library (233). In particular, the imaging engine (222) uses an object store to organize the prestack image library (233) and the stacked images (234). An example of generating the stacked images (234) from the prestack images (e.g., prestack image (233-1)) is described in reference to FIG. 3.1 below.

In one or more embodiments, the enhancement engine (223) is configured to enhance the quality of stacked images (234) by applying one or more filters to the underlying prestack images and/or lower level stacked images. In particular, the enhancement engine (223) generates the enhanced intermediate and final results using an object store to organize the prestack image library (233) and the stacked images (234). An example of the filters and object store is described in reference to FIGS. 1.3 and 3 below.

FIG. 1.3 shows an example object store (130) used by the imaging engine (222) and the enhancement engine (223). Specifically, FIG. 1.3 shows an example organization of the prestack image library (233) and the stacked images (234) in the data repository (238) depicted in FIG. 1.2 above. In one or more embodiments, one or more of the modules and elements shown in FIG. 1.3 may be omitted, repeated, and/or substituted. Accordingly, embodiments of geological imaging and inversion using object storage should not be considered limited to the specific arrangements of modules shown in FIG. 1.3.

Within the object store (130) shown in FIG. 1.3, the prestack image library (233) includes selected sets of prestack images (e.g., prestack image set A (333-1), prestack image set B (334-1), etc.). In one or more embodiments, the prestack image set A (333-1) and/or prestack image set B (334-1) are selected by the imaging engine (222) from the prestack image library (233) according to a predetermined criterion. For example, the prestack image set A (333-1) may be formed by randomly selecting prestack images (e.g., prestack image A (333-2)), referred to as a stochastic criterion. In another example, the prestack image set B (334-1) may be formed by selecting prestack images (e.g., prestack image B (334-2)) having one or more common gather parameter values (e.g., shot coordinate, acquisition coordinate, incidence angle, energy level, time duration, acquisition time, etc.), referred to as a gather parameter criterion. In particular, the prestack image A (333-2)) and/or prestack image set B (334-1) may correspond to the prestack image (233-1) depicted in FIG. 1.2 above.

In one or more embodiments, the prestack image set A (333-1) and prestack image set B (334-1) are assigned metadata A (333-4) and metadata B (334-4), respectively, that describe characteristics of the underlying prestack images. For example, the metadata A (333-4) may include the processing time point and software version of the seismic migration software used by the imaging engine (222) to generate the prestack images (e.g., prestack image A (333-2)) of the prestack image set A (333-1). In another example, the metadata B (334-4) may include the common gather parameter values (e.g., shot coordinates, acquisition coordinates, incidence angle, energy level, time duration, acquisition time, etc.) used by the imaging engine (222) to select prestack images (e.g., prestack image B (334-2)) of the prestack image set B (334-1). In one or more embodiments, the metadata A (333-4) and metadata B (334-4) further include portions of the failure recovery metadata (236), depicted in FIG. 1.2 above, that pertains to individual images of the prestack image set A (333-1) and prestack image set B (334-1).

Within the object store (130) shown in FIG. 1.3, the stacked images (234) include the stacked image A (335-1), stacked image B (336-1), stacked image C (337-1), and stacked image D (338-1) that are hierarchically generated by the imaging engine (222). In particular, the stacked image A (335-1), stacked image B (336-1), stacked image C (337-1), and stacked image D (338-1) are examples of the stacked image (234-1) depicted in FIG. 1.2 above. In one or more embodiments, the prestack image set A (333-1) is combined by the imaging engine (222) into the stacked image A (335-1) where the lineage A (335-2) represents a list of prestack images in the prestack image set A (333-1). In one or more embodiments, as computer system (e.g., hardware or system software) failures and network failures occur from time to time in the E&P computer system (118), the lineage A (335-2) is used by the imaging engine (222) to ensure that combining the prestack image set A (333-1) either completely occurs or takes no effect.

Similarly, the prestack image set B (334-1) is combined by the imaging engine (222) into the stacked image B (336-1) where the lineage B (336-2) represents a list of prestack images in the prestack image set B (334-1). In one or more embodiments, the stacked image A (335-1) and stacked image B (336-1) inherit the metadata A (333-4) and metadata B (334-4), respectively from the underlying prestack image sets. For example, the lineage A (335-2) and lineage B (336-2) may be derived from the metadata A (333-4) and metadata B (334-4), respectively. In addition, portions of the failure recovery metadata (236), depicted in FIG. 1.2 above, pertain to the stacked image A (335-1) and stacked image B (336-1) without being explicitly shown.

In one or more embodiments, the stacked image A (335-1), stacked image B (336-1), and other selected stacked images (or selected prestack images if any) are combined by the imaging engine (222) into the stacked image C (337-1) where the lineage C (337-2) represents a list of stacked images contributing to the stacked image C (337-1). Similarly, the stacked image C (337-1) and other selected stacked images (or selected prestack images if any) are hierarchically combined by the imaging engine (222) into the stacked image D (338-1) where the lineage D (338-2) represents a list of stacked images contributing to the stacked image D (338-1). In addition, portions of the failure recovery metadata (236), depicted in FIG. 1.2 above, pertain to the stacked image C (337-1) and stacked image D (338-1) without being explicitly shown.

As described above, the iterative combinations performed by the imaging engine (222) form a hierarchical tree based on parent-child relationships of the prestack images and stacked images. The iterative combinations may be ordered and sequential or performed in parallel. As shown in FIG. 1.3, the prestack images (e.g., prestack image A (333-2), prestack image B (334-2), etc) in the prestack image library (233) are leaf nodes of the hierarchical tree. The stacked image A (335-1) and stacked image B (336-1) are among the first level stacked image nodes, as parents of the leaf nodes. The stacked image C (337-1) is one of the second level stacked image nodes, as parents of the first level stacked image nodes. In addition, the stacked image D (338-1) has no parent node in the hierarchical tree and is the final result of the imaging engine (222). In this context, the stacked image D (338-1) is referred to as the top level (or root) stacked image or top level node (or root) of the hierarchical tree. The stacked image A (335-1), stacked image B (336-1), and stacked image C (337-1) are referred to as intermediate or lower level stacked images (i.e., lower level nodes) of the hierarchical tree. Further, the second level and higher level stacked images are referred to as hierarchically stacked images in the sense that they are stacked more than once.

As noted above, one or more prestack images (e.g., prestack image A (333-2), prestack image B (334-2)) may include an artifact (e.g., a coherent noise artifact, an illumination gap artifact, a phase misalignment artifact, an image multiples artifact, etc.) associated with respective gather parameters. Accordingly, at least a portion of such prestack image fails to meet a quality criterion. The artifact in such prestack images may contribute to low quality of a stacked image that is generated therefrom. In one or more embodiments, the enhancement engine (223) selects a stacked image (e.g., stacked image D (338-1), stacked image C (337-1), stacked image B (336-1), stacked image A (335-1), etc.) as a reference image to enhance qualities of lower level nodes in the hierarchical tree. The quality of the reference image is generally higher than lower level nodes because the artifacts contained in the lower level nodes may cancel out statistically. As will be described in reference to FIG. 2.1 below, the stacked image A (335-1) may be enhanced to become an enhanced stacked image. In the context of description in reference to FIG. 2.1 below, the stacked image C (337-1) is referred to as a hierarchically stacked image, which may be enhanced to become an enhanced hierarchically stacked image. The enhanced stacked image derived from the stacked image A (335-1) and the hierarchically stacked image derived from the stacked image C (337) are examples of the enhanced stacked image (234-2) depicted in FIG. 1.2 above.

In one or more embodiments, the stacked image D (338-1) (i.e., the reference image) and the prestack image A (333-2) are compared by the enhancement engine (223) to generate a correlation. Based on the correlation, a quality measure of the prestack image A (333-2) is determined. For example, the quality measure may identify a portion of the prestack image A (333-2) that fails to meet a quality criterion specified based on a threshold of the correlation. In other words, the portion of the prestack image A (333-2) where the correlation exceeds the threshold is assigned a high quality level. In contrast, the portion of the prestack image A (333-2) where the correlation is below the threshold is assigned a low quality level. In one or more embodiments, the quality level is proportional to said correlation.

In one or more embodiments, the quality level is used as a weighted filter (i.e., spatial variant weight A (333-3)) to modify the prestack image A (333-2). Specifically, the spatial variant weight A (333-3) is a set of numerical weights assigned to portions (e.g., pixels or regions) in the prestack image A (333-2) where the value of each numerical weight is dependent on a corresponding seismic event location. For example, the enhancement engine (223) may generate a filtered prestack image by applying the spatial variant weight A (333-3) to the prestack image A (333-2). In particular, applying the spatial variant weight A (333-3) is by multiplying each location dependent numerical weight and a corresponding pixel value throughout the prestack image A (333-2). The multiplication suppresses the pixels' values in low quality portion, relative to the high quality portion, of the prestack image A (333-2). Accordingly, the stacked image A (335-1) may be regenerated by combining the prestack image set A (333-1) where the prestack image A (333-2) is substituted by the filtered prestack image. The regenerated stacked image A (335-1) may correspond to the enhanced stacked image (234-2) depicted in FIG. 1.2 above.

Similar to the spatial variant weight A (333-3), the stacked image D (338-1) (i.e., the reference image) and the prestack image B (334-2) may also be compared by the enhancement engine (223) to generate the spatial variant weight B (334-3). In an example scenario, the spatial variant weight B (334-3) may identify the entirety of the prestack image B (334-2) as high quality. As a result, no filtered prestack image is generated from the prestack image B (334-2). In addition, the contribution from the prestack image B (334-2) to the stacked image B (336-1) is weighted higher than other relatively low quality prestack images in the prestack image set B (334-1). In another example scenario, the spatial variant weight B (334-3) may identify the entirety of the prestack image B (334-2) as low quality. As a result, the prestack image B (334-2) may be removed from the prestack image set B (334-1) to regenerate the stacked image B (336-1). The regenerated stacked image B (336-1) may correspond to the enhanced stacked image (234-2) depicted in FIG. 1.2 above. Although not explicitly shown in FIG. 1.3, one or more stacked images (e.g., stacked image A (335-1), stacked image B (336-1), stacked image C (337-1) may also be compared with the reference image (e.g., stacked image D (338-1)) by the enhancement engine (223) to generate respective quality measures and resultant filters. Accordingly, the enhancement engine (223) may apply the resultant filters to each level of the stacked image nodes in the hierarchical tree and enhance the final output (i.e., stacked image D (338-1)) of the enhancement engine (223).

Similar to the spatial variant weights for the prestack images, the stacked image D (338-1) (i.e., the reference image) and the stacked image C (337-1) may also be compared by the enhancement engine (223) to generate the spatial variant weight C (337-3). Although not explicitly shown, the stacked image D (338-1) (i.e., the reference image) and other stacked images (e.g., stacked image A (335-1), stacked image B (336-1)) may also be compared by the enhancement engine (223) to generate respective spatial variant weights.

Returning to the discussion of FIG. 1.2, in one or more embodiments, the enhancement engine (223) generates the enhanced intermediate and final results of the E&P tool (230) using the method described with reference to FIG. 2.2 below. An example of generating the enhanced intermediate and final results of the E&P tool (230) is described with reference to FIGS. 3.1 and 3.2 below.

In one or more embodiments, the model generator (224) is configured to generate the earth model (235) based at least one the enhanced stacked image (234-2). For example, the enhanced stacked image (234-2) and/or intermediate/final results derived from the enhanced stacked image (234-2) may be analyzed by the model generator (224) to compute the aforementioned geological and/or geophysical parameters that are assigned to grid cells of the earth model (235).

In one or more embodiments, the E&P computer system (118) includes the display device (239), which may be a 2D display, 3D display, or other suitable displays for displaying the prestack images (e.g., prestack image (233-1)), the stacked images (234), and/or the earth model (235).

In one or more embodiments, the E&P computer system (118) includes the field task engine (240) that is configured to generate a field operation control signal based at least on a result generated by the E&P tool (230), such as based on the enhanced stacked image (234-2). As noted above, the field operation equipment depicted in FIG. 1.1 may be controlled by the field operation control signal. For example, the field operation control signal may be used to control drilling equipment, an actuator, a fluid valve, or other electrical and/or mechanical devices disposed about the field (100) depicted in FIG. 1.1 above. In particular, the field planning operation, drilling operation, production operation, etc. may be performed based on the earth model (235) generated from at least the enhanced stacked image (234-2).

The E&P computer system (118) may include one or more system computers, such as shown in FIGS. 4.1 and 4.2 below, which may be implemented as a server or any conventional computing system. However, those skilled in the art, having benefit of this disclosure, will appreciate that implementations of various technologies described herein may be practiced in other computer system configurations, including hypertext transfer protocol (HTTP) servers, handheld devices, multiprocessor systems, microprocessor-based or programmable consumer electronics, network personal computers, minicomputers, mainframe computers, and the like.

While specific components are depicted and/or described for use in the units and/or modules of the E&P computer system (118) and the E&P tool (230), a variety of components with various functions may be used to provide the formatting, processing, utility and coordination functions for the E&P computer system (118) and the E&P tool (230). The components may have combined functionalities and may be implemented as software, hardware, firmware, or combinations thereof.

FIGS. 2.1 and 2.2 depict an example method in accordance with one or more embodiments. For example, the method depicted in FIGS. 2.1 and 2.2 may be practiced using the E&P computer system (118) described with reference to FIGS. 1.1, 1.2, and 1.4 above. In one or more embodiments, one or more of the elements shown in FIGS. 2.1 and 2.2 may be omitted, repeated, and/or performed in a different order. Accordingly, embodiments of geological imaging and inversion using object storage should not be considered limited to the specific arrangements of elements shown in FIGS. 2.1 and 2.2.

Specifically, FIG. 2.1 shows a method for geological imaging through use of object storage. Initially, a geological data collection is acquired in a manner shown or described in relation to FIGS. 1.1, 1.2, and 1.3 or in any manner now known or contemplated by one of ordinary skill in the art with the benefit of this disclosure. In one or more embodiments, the geological data collection includes a library of prestack images.

In Block 210, a set of prestack images is selected from the prestack image library according to a predetermined criterion. In one or more embodiments, the selection is according to a stochastic algorithm where prestack images are randomly selected from the library to form the set. In one or more embodiments, the selection is according to a gather parameter where prestack images having one or more common gather parameter values are selected from the library to form the set. For example, prestack images are selected that have one or more of the same or similar shot coordinate, acquisition coordinate, incidence angle, energy level, time duration, acquisition time, etc.

In Block 211, a hierarchically stacked image is generated by hierarchically combining at least the set of prestack images selected from the object store. In one or more embodiments, the hierarchically stacked image is selected as a reference image for assessing quality levels of one or more prestack images and/or stacked images. As used herein, "hierarchically combining" refers to multiple combining actions that generate multiple hierarchical levels of stacked images. Further, "hierarchically stacked" refers to being stacked across multiple hierarchical levels. In one or more embodiments, the set of prestack images is combined to generate a stacked image. In addition, the stacked image is further combined with other stacked images and/or prestack images to generate the hierarchically stacked image, which is selected as the reference image. In one or more embodiments, the hierarchically stacked image may be at the top level (or root) or at an intermediate level of a hierarchical tree in the object store. In one or more embodiments, Blocks 210 and 211 are performed using the imaging engine described in reference to FIG. 1.2 above. In one or more embodiments, the hierarchically stacked image is selected as a reference image used by the enhancement engine described in reference to FIG. 1.2 above.

In one or more embodiments, the hierarchical tree is formed in the object store as a result of hierarchically combining the prestack images and stacked images prior to deleting at least a portion of the prestack images or stacked images from the object store.

In Block 212, a quality measure of a test image is generated based at least on comparing a test image with the reference image. In particular, the test image is hierarchically formed from one or more prestack images. The test image may be a prestack image or a stacked image. In such a scenario in which the test image is a prestack image, a quality measure of the prestack image is generated based at least on the hierarchically stacked image. In one or more embodiments, the reference image and the test image are compared to generate the quality measure. For example, individual pixels present in both the reference image and the prestack image may be individually or separately compared. In one or more embodiments, the quality measure is generated to identify portions of the prestack image with varying quality levels. For example, the quality level may correspond to a pixel value difference between the reference image and the prestack image. In particular, the larger the pixel value difference, the lower the quality level, and vice versa. In this context, the quality measure is referred to as the spatial variant quality measure. In one or more embodiments, the quality measure is generated to represent an extent of the failing portion of the prestack image. In particular, the larger the extent of failing portion, the lower the quality measure, and vice versa. In this context, the quality measure is referred to as the unified quality measure.

In one or more embodiments, the quality measure of the prestack image is generated prior to deleting the prestack image from the object store. In other words, the quality measure of the prestack image is generated without regenerating the prestack image.

In Block 213, a determination is made as to whether the quality measure meets a quality criterion. If the determination is negative, i.e., the quality measure is does not meet the quality criterion, the method proceeds to Block 214. For example, the spatial variant quality measure may identify a portion (referred to as the failing portion) of the prestack image where pixel value differences between the reference image and the prestack image exceeds a predetermined threshold. In another example, the unified quality measure may identify that the failing portion exceeds a predetermined extent. In one or more embodiments, the failing portion of the prestack image corresponds to an acquisition artifact associated with one or more of shot coordinate, acquisition coordinate, incidence angle, energy level, time duration, acquisition time, etc. For example, the acquisition artifact may be a coherent noise artifact, an illumination gap artifact, a phase misalignment artifact, and/or an image multiples artifact.

If the determination in Block 213 is positive, i.e., the quality measure meets the quality criterion, the method proceeds to Block 215 where a further determination is made as to whether any prestack image unused to form the test image still remains to be quality checked. If the determination in Block 215 is positive, i.e., at least one prestack image unused to form the test image still remains (referred to as the remaining prestack image) to be quality checked, the method returns to Block 212 where another test image is generated from the remaining prestack image and a corresponding quality measure is generated. If the determination in Block 215 is negative, i.e., no more remaining prestack image to be quality checked, the method proceeds to Block 216.

In Block 214, the prestack image is modified to generate a filtered prestack image. In one or more embodiments, the failing portion of the prestack image is filtered using a spatial variant weight. In particular, the spatial variant weight reduces a contribution from the failing portion to the stacked images in the hierarchical tree of the object store. In contrast, the spatial variant weight maintains the contribution from the non-failing portion of the prestack image to the stacked images in the hierarchical tree of the object store. In one or more embodiments, the prestack image having any failing portion is assigned a relative weight inversely proportional to the unified quality measure. In particular, the relative weight adjusts, based on the unified quality measure, the contribution from the prestack image to the stacked images in the hierarchical tree of the object store.

In one or more embodiments, the prestack image is modified to generate the filtered prestack image prior to deleting the prestack image from the object store. In other words, the filtered prestack image is generated without regenerating the prestack image.

In Block 216, the set of prestack images is recombined, based at least on the quality measure, to generate an enhanced stacked image. In other words, the set of prestack images is further combined, based at least on the quality measure and prior to deleting at least a subset of the prestack images from the object store, to generate an enhanced stacked image. In particular, the enhanced stacked image is enhanced from the stacked image previously generated from the set of prestack images in Block 211. For example, the previously generated prestack image is substituted, from the set of prestack images, by the filtered prestack image to be recombined to generate the enhanced stacked image.

In one or more embodiments, the set of prestack images is recombined to generate the enhanced stacked image prior to deleting at least a subset (e.g., a substantial portion, such as 100%, 90%, 80%, etc.) of the prestack images from the object store. For example, the set of prestack images is recombined prior to being deleted from the object store. Accordingly, the enhanced stacked image is generated without regenerating the prestack images.

In Block 217, the stacked image, previously used to generate the hierarchically stacked image in Block 211, is substituted with the enhanced stacked image.

Accordingly, in Block 218, the set of stacked images, previously used to generate the hierarchically stacked image in Block 211 and now including the enhanced stacked image, is recombined to generate an enhanced hierarchically stacked image. In other words, subsequent to the substituting and prior to deleting at least a subset of the stacked images from the object store, the stacked images are further combined to generate an enhanced hierarchically stacked image In one or more embodiments, the set of stacked images is recombined to generate the enhanced hierarchically stacked image prior to deleting at least a subset (e.g., a substantial portion, such as 100%, 90%, 80%, etc.) of the prestack images from the object store. For example, the set of stacked images is recombined prior to the underlying prestack images being deleted from the object store. Accordingly, the enhanced hierarchically stacked image is generated without regenerating the underlying prestack images.

In Block 219, a determination is made as to whether more enhancement is to be made. If the determination is positive, i.e., more enhancement is to be made, the method returns to Block 212 where the enhanced hierarchically stacked image is used as the reference image to further generate the quality measures of test images. If the determination is negative, i.e., no more enhancement is to be made, the method proceeds to Block 220 where the enhanced hierarchically stacked image, or a result derived therefrom, is presented. In one or more embodiments, presenting the enhanced hierarchically stacked image includes presenting to a user, sending to a separate software application for further processing, etc. In one or more embodiments, an earth model is generated based at least on the enhanced hierarchically stacked image. In one or more embodiments, pixel values of the enhanced hierarchically stacked image are analyzed to determine geological and/or geophysical parameter values contained in the earth model. In one or more embodiments, generating the earth model includes creating a new earth model. In one or more embodiments, generating the earth model includes validating, adjusting, expanding, or otherwise updating an existing earth model.

In one or more embodiments, as the prestack images are iteratively modified to improve their quality measure as described above, the quality of the earth model is iteratively improved through an objective function based at least on the prestack images.

In one or more embodiments, the earth model is used in analyzing, modeling, controlling, optimizing, or performing management tasks of the aforementioned field operations described in reference to FIG. 1.1 above.

In one or more embodiments, subsequent to completing the enhancement to the hierarchical tree in the object store as described above, at least a subset (e.g., a substantial portion, such as 100%, 90%, 80%, etc.) of the entire prestack image library is deleted from the object store to release the computing and storage resources for performing other workflows.

In one or more embodiments, additional processing may be performed subsequent to generating the enhanced hierarchically stacked image and prior to generating the earth model. For example, the hierarchical tree may be pruned to remove, or mark as ignored, at least a portion of the prestack image library. The pruned hierarchical tree may be used to perform additional enhancement, separate from the workflow described above, to the enhanced hierarchically stacked image before the earth model is generated.

As noted above, hundreds, thousands, tens of thousands, hundreds of thousands, or more prestack images may exist, at a single point in time, in the prestack image library that are stored in the object store spanning hundreds, thousands, or more physical storages. In one or more embodiments, one or more of the Blocks 210 through 220 of the geological imaging workflow are performed by multiple computing nodes, such as the computer system A (118-1), computer system B (118-2), etc. depicted in FIG. 1.2 above. For example, hundreds, thousands, tens of thousands, hundreds of thousands, or more prestack images may be divided and processed by hundreds, thousands, or more computing nodes in a concurrent manner to perform the geological imaging workflow. From time to time, the large number of computing nodes and physical storages may fail resulting in disruption of an operation being performed by the failing device. In one or more embodiments, the object store facilitates failure recovery of the geological imaging, e.g., using the method described in reference to FIG. 2.2 below.

FIG. 2.2 shows a method for failure recovery in geological imaging through use of object storage. Initially in Block 241, a failure is detected during an operation of the geological imaging. For example, the failure may be due to a hardware and/or software issue resulting in the disruption of the operation of the geological imaging. In one or more embodiments, detecting the failure is facilitated by using the failure recovery metadata of the object store. For example, the failure detection may be triggered or otherwise facilitated by a data object checksum error, lineage discrepancy, etc. that occurred during the operation.

In Block 242, a checkpoint generated prior to the failure is identified. In one or more embodiments, a software state snapshot is stored from time to time as checkpoints during the geological imaging workflow. For example, the software state snapshot may include information associated with hundreds, thousands, tens of thousands, hundreds of thousands, or more prestack images and stacked images, hundreds, thousands, or more computing nodes, and hundreds, thousands, or more storage devices.

In Block 243, the operation of the geological imaging is repeated based at least on the checkpoint. In one or more embodiments, the geological imaging workflow is restarted from the checkpoint. For example, restarting the geological imaging workflow may be facilitated via data lineage based on the object tags of hundreds, thousands, tens of thousands, hundreds of thousands, or more prestack images and stacked images. In one or more embodiments, other failure recovery metadata in addition to the object tag, checksum, and object lineage described above may also be used to facilitate detecting failure and restarting the geological imaging workflow.

Accordingly, the method depicted in FIG. 2.2 above improves the reliability of performing geological imaging based on a large number of prestack images described in reference to FIG. 2.1 above. Using the object tag and the tree structure, one or more embodiments allow the system to recover after an interruption, such as failure, in the system. In other words, the system is able to identify the images that have not yet been incorporated and continue the stacking process from the failure location.

FIG. 3 shows an example in accordance with one or more embodiments. Specifically, the example enhances geological images using spatially variant summation branches. A summation branch is a portion of the hierarchical tree used to hierarchically combine prestack images to generate a stacked image. The spatially variant summation branch combines prestack images from nearby shot locations that are likely to have similar illumination patterns. Specifically, summation branches (e.g., summation branch A (320), summation branch B (330), summation branch C (340), etc.) are selected in the hierarchical tree (310) according to locality in the distribution of the spatial coordinates of the shot locations shown in the plot (300). Notice that the summation branches for generating the stacked images may or may not be the same as the summation branches used to generate the reference image. The hierarchical tree (310) is an example of the hierarchical tree of the object store (130) depicted in FIG. 1.3 above.

As shown in FIG. 3, the plot (300) shows shot locations with the vertical and horizontal axes representing the surface coordinates Shot x and Shot y, respectively. Within the plot (300), the dots represent shot locations of individual prestack images (e.g., prestack image A shot location (301), prestack image B shot location (302), prestack image C shot location (307), etc.) while the larger circles represent shot location ranges of varying levels of stacked images (e.g., stacked image shot locations (303), hierarchically stacked image A shot locations (304), hierarchically stacked image shot locations B (305), etc.) that are generated using the summation branches shown in the corresponding hierarchical tree (310). Specifically, the prestack image A shot location (301), prestack image B shot location (302), and prestack image C shot location (307) depicted in the plot (300) correspond to the nodes (311), (312), and (313), respectively, of the hierarchical tree (310). Similarly, the stacked image shot locations (303), hierarchically stacked image A shot locations (304), and hierarchically stacked image B shot locations (305) depicted in the plot (300) correspond to the nodes (321), (331), and (351), respectively, of the hierarchical tree (310). Further, the top level node (or root) (341) of the hierarchical tree (310) corresponds to the entire earth region (306) in the plot (300).

Although nine shot locations are shown within the earth region (306) that correspond to the nine leaf nodes in the hierarchical tree (310), many more shot locations may exist even though they are not explicitly shown for the sake of clarity. The combination of shot locations is selected to illuminate the earth region (306). In areas within the earth region (306) where an individual shot location fails to illuminate, seismic migration may produce coherent artifacts that degrade the prestack image and subsequently generated stacked images. By comparing an individual prestack image or stacked image to the reference image, the quality measure may identify a portion of the prestack image or stacked image where the coherent artifacts exist. Accordingly, a spatial variant weight de-emphasizes (i.e., filter out) such portion of the prestack image or stacked image. For example, the spatial variant weight for the node (311) may filter out the portion of the earth region (306), in a corresponding prestack image, that is not well illuminated by the prestack image A shot location (301). In another example, the spatial variant weight for the node (321) may filter out the portion of the earth region (306), in a corresponding stacked image, that is not well illuminated by the stacked image shot locations (303).

Misalignment among prestack images may exist due to inaccuracy in earth parameters used in seismic migration. In particular, moveout errors in the reflection locations may vary according to shot locations. The variations generally are a continuous function of space in terms of the image and shot location. By comparing an individual prestack image or stacked image to the reference image, the quality measure may estimate the misalignment to generate a spatially variant filter. The spatially variant filter may then be used as proxy for moveout errors and/or used in a tomography loop. When stacking slightly misaligned images, higher wave-number information is lost. The spatial variant filter may be used to mitigate the alignment errors and recover higher wave-number information in the final stacked image.

Applying the aforementioned spatial variant weight or spatial variant filter may be represented mathematically as the summation formula below where $I_{enhanced}$ denotes a stacked image, $F_{leaf}$ denotes the variant weight or spatial variant filter, and $I_{leaf}$ denotes a prestack image. For example, the summation sign may denote summing leaf nodes of a summation branch to generate an intermediate level stacked image. In another example, the summation sign may denote summing leaf nodes of the hierarchical tree to generate the top level stacked image.

$$I_{enhanced} = \sum_{leaf} F_{leaf} I_{leaf}$$

The summation formula may be iterated by using the enhanced image as a new reference image. One or more iterations may also change the summation branch selections, remove one or more branches to prune the hierarchical tree, or modify the spatial variant weight/filter.

Although the example described above uses the shot location as selection criteria for the summation branches, other selection criteria may include receiver location, midpoint, offset/azimuth, or other gather parameters.

Generally, hundreds or thousands of shot locations may exist within the earth region (306) and multiple prestack images may be generated from one of these shot locations. For example, hundreds, thousands, tens of thousands, hundreds of thousands, or more seismic prestack images may be generated from these shot locations and processed by hundreds, thousands, or more computing nodes. For fault tolerance of the geological imaging process, the last valid partial summation results available and remaining partial summation yet to be complete are identified when a failure disrupts an operation in computing a summation branch. In the example shown in FIG. 3, the last valid partial summation results available and remaining partial summation yet to be complete are maintained as a particular failure recovery metadata. This particular failure recovery metadata, among other failure recovery metadata provided by the object store, are used to restart the disrupted summation branch computation, decide which parts were already done, and restart in a place that would yield the same results, ensuring that no image summation is duplicated.

One or more embodiments of geological imaging and inversion using object storage may be implemented in owned or leased datacenters using commercial object store systems, such as, for example, EMC's Atmos, OpenStack's Swift or Scality's RING, or in public cloud computing systems using cloud storage services such as, for example, Amazon's Web Services S3, Google's Cloud Storage, Microsoft's Azure Storage, and/or Rackable's Files. One or more computing systems used in the commercial object store systems or public cloud computing systems may include a system such as the one described below and shown in relation to FIGS. 4.1 and 4.2 below.

One or more embodiments of geological imaging and inversion using object storage involve taking advantage of large scale cloud based object storage services to keep prestack images and partial sums instead of eliminating them as soon as possible. As a result, one or more embodiments are capable of performing post-imaging and stacking enhancements without re-computing prestack images while also allowing for defining and refining the reduction algorithm independently of the prestack imaging procedure.

As a result, prestack migrated images are computed with programs that store the generated individual outputs in an object storage, or a cloud-based object-based storage service. Using object storage, which may be scalable, or cloud storage systems whose capacity is vastly superior to the prestack image library size at any current time, allows for the persistent storage of prestack images and partial sums.

The algorithms used in prestack migration introduce coherent noise in images due to acquisition footprint limitation, to complex illumination gaps or mis-migrated data such as multiples. The stacking process allows for enhancement of signal over noise ratio based on a signal over noise sqrt(N) behavior (i.e., Nyquist-Shannon theorem). To achieve better signal to noise ratios, weighting functions may be designed based on signal coherency estimates.

One or more embodiments of geological imaging and inversion using object storage involve computing, after the prestack migration, custom spatial variant weights for prestack images in parallel. The custom spatial variant weights may be obtained by applying local coherency estimates based on a reference model, such as a stacked image or a hierarchically stacked image. The process of computing weights for prestack images in parallel may be achieved in an iterative fashion because prestack images are still available in object storage.

Instead of relying on pre-migration design of the partial stacks, so-called stochastic gradient descent methods are now possible, whereby randomized subsets of the prestack images are chosen to perform one iteration of the inversion.

Migration Velocity Analysis (MVA) techniques rely on measuring moveout in image gathers and flattening them to obtain refined earth models. The techniques are very sensitive to noise caused by lack of illumination and acquisition footprint because gathers rely on less stacked contributions, which are inherently noisier than stacked images. Consequently, applying accurate filtering to prestack gathers improves the quality of MVA results. Using the prestack images to design these filters as opposed to an a priori design of partial sums allows for better filters, better filtered gathers and therefore improved earth model estimates.

In full waveform inversion, the data space observed measurements are of orders of magnitude bigger than the model space. Storing prestack gradients in object storage allows for the design of higher dimension objective functions by adding some acquisition parameter to the model space in accordance with one or more embodiments of geological imaging and inversion using object storage. As a result, the inversion process is sped up and local minima are avoided.

One or more embodiments of geological imaging and inversion using object storage involve using object storage systems for prestack geological data imaging. Moreover, one or more embodiments involve taking advantage of the immutable and parallel nature of object storages to perform image reductions and post imaging enhancement algorithms.

Specifically, one or more embodiments of geological imaging and inversion using object storage involve systems and methods for decoupling prestack images production to produce (potentially enhanced) stacked (reduced) subsurface images by taking advantage of large scale cloud-based object storage services to keep prestack images and partial sums instead of eliminating them as soon as possible, thereby allowing for post-imaging and stacking enhancements without re-computing prestack images.

Object storage may be outfitted with hierarchical caching systems, eventually scavenging higher bandwidth resources available, such as instances of free memory, or burst buffer machines with higher bandwidth and lower latency storage, thus resulting in performance enhancements over conventional, local disk based storage systems.

One or more embodiments of geological imaging and inversion using object storage allow more flexibility by decoupling the imaging and the stacking mechanism while adding potentially very large savings as any re-stacking can be done independently or partially.

In accordance with one or more embodiments of geological imaging and inversion using object storage, the process initiates when prestack migrated images are computed with programs that store their individual outputs in an object storage or a cloud-based object-based storage service. Next, reduction operations, such as stacking, compute partial sums from the object storage and save the results into their own objects.

Fault tolerance of the reduction operation is provided by:
Keeping metadata about which original prestack images contributed to a given object.
Relying on the full-object atomicity of object storage and/or through a metadata flag signaling that the object has been fully written. Full-object atomicity means that operations on objects are done as transactions that can be rolled-back if the transactions failed or were interrupted.
Check-summing stored intermediate results.
Relying on the object store's checksum metadata to guarantee the object's integrity during copies and reads.
Implementing checksums of partial reads into memory.
Doing partial sums in a tree-like fashion, making sure that failures result in a limited amount of re-work from a safe checkpoint. (known objects with valid checksums)
Such a combination allows to re-start reductions if interrupted with minimal re-work.

Embodiments of geological imaging and inversion using object storage may be implemented on a computing system. Any combination of mobile, desktop, server, router, switch, embedded device, or other types of hardware may be used. For example, as shown in FIG. 4.1, the computing system (400) may include one or more computer processors (402), non-persistent storage (404) (e.g., volatile memory, such as random access memory (RAM), cache memory), persistent storage (406) (e.g., a hard disk, an optical drive such as a compact disk (CD) drive or digital versatile disk (DVD) drive, a flash memory, etc.), a communication interface (412) (e.g., Bluetooth interface, infrared interface, network interface, optical interface, etc.), and numerous other elements and functionalities.

The computer processor(s) (402) may be an integrated circuit for processing instructions. For example, the computer processor(s) may be one or more cores or micro-cores of a processor. The computing system (400) may also include one or more input devices (410), such as a touchscreen, keyboard, mouse, microphone, touchpad, electronic pen, or any other type of input device.

The communication interface (412) may include an integrated circuit for connecting the computing system (400) to a network (not shown) (e.g., a local area network (LAN), a wide area network (WAN) such as the Internet, mobile network, or any other type of network) and/or to another device, such as another computing device.

Further, the computing system (400) may include one or more output devices (408), such as a screen (e.g., a liquid crystal display (LCD), a plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) (402), non-persistent storage (404), and persistent storage (406). Many different types of computing systems exist, and the aforementioned input and output device(s) may take other forms.

Software instructions in the form of computer readable program code to perform embodiments may be stored, in whole or in part, temporarily or permanently, on a non-transitory computer readable medium such as a CD, DVD, storage device, a diskette, a tape, flash memory, physical memory, or any other computer readable storage medium. Specifically, the software instructions may correspond to computer readable program code that, when executed by a processor(s), is configured to perform one or more embodiments.

The computing system (400) in FIG. 4.1 may be connected to or be a part of a network. For example, as shown in FIG. 4.2, the network (420) may include multiple nodes (e.g., node X (422), node Y (424)). Each node may correspond to a computing system, such as the computing system shown in FIG. 4.1, or a group of nodes combined may correspond to the computing system shown in FIG. 4.1. By way of an example, embodiments may be implemented on a node of a distributed system that is connected to other nodes. By way of another example, embodiments may be implemented on a distributed computing system having multiple nodes, where each portion of an embodiment may be located on a different node within the distributed computing system. Further, one or more elements of the aforementioned computing system (400) may be located at a remote location and connected to the other elements over a network.

Although not shown in FIG. 4.2, the node may correspond to a blade in a server chassis that is connected to other nodes via a backplane. By way of another example, the node may correspond to a server in a data center. By way of another example, the node may correspond to a computer processor or micro-core of a computer processor with shared memory and/or resources.

The nodes (e.g., node X (422), node Y (424)) in the network (420) may be configured to provide services for a client device (426). For example, the nodes may be part of a cloud computing system. The nodes may include functionality to receive requests from the client device (426) and transmit responses to the client device (426). The client device (426) may be a computing system, such as the computing system shown in FIG. 4.1. Further, the client device (426) may include and/or perform the entirety or a portion of one or more embodiments.

The computing system or group of computing systems described in FIGS. 4.1 and 4.2 may include functionality to perform a variety of operations disclosed herein. For example, the computing system(s) may perform communication between processes on the same or different system. A variety of mechanisms, employing some form of active or passive communication, may facilitate the exchange of data between processes on the same device. Examples representative of these inter-process communications include, but are not limited to, the implementation of a file, a signal, a socket, a message queue, a pipeline, a semaphore, shared memory, message passing, and a memory-mapped file. Further details pertaining to a couple of these non-limiting examples are provided below.

Based on the client-server networking model, sockets may serve as interfaces or communication channel endpoints enabling bidirectional data transfer between processes on the same device. Foremost, following the client-server networking model, a server process (e.g., a process that provides data) may create a first socket object. Next, the server process binds the first socket object, thereby associating the first socket object with a unique name and/or address. After creating and binding the first socket object, the server process then waits and listens for incoming connection requests from one or more client processes (e.g., processes that seek data). At this point, when a client process wishes to obtain data from a server process, the client process starts by creating a second socket object. The client process then proceeds to generate a connection request that includes at least the second socket object and the unique name and/or address associated with the first socket object. The client process then transmits the connection request to the server process. Depending on availability, the server process may accept the connection request, establishing a communication channel with the client process, or the server process, busy in handling other operations, may queue the connection request in a buffer until server process is ready. An established connection informs the client process that communications may commence. In response, the client process may generate a data request specifying the data that the client process wishes to obtain. The data request is subsequently transmitted to the server process. Upon receiving the data request, the server process analyzes the request and gathers the requested data. Finally, the server process then generates a reply including at least the requested data and transmits the reply to the client process. The data may be transferred, more commonly, as datagrams or a stream of characters (e.g., bytes).

Shared memory refers to the allocation of virtual memory space in order to substantiate a mechanism for which data may be communicated and/or accessed by multiple processes. In implementing shared memory, an initializing process first creates a shareable segment in persistent or non-persistent storage. Post creation, the initializing process then mounts the shareable segment, subsequently mapping the shareable segment into the address space associated with the initializing process. Following the mounting, the initializing process proceeds to identify and grant access permission to one or more authorized processes that may also write and read data to and from the shareable segment. Changes made to the data in the shareable segment by one process may immediately affect other processes, which are also linked to the shareable segment. Further, when one of the authorized processes accesses the shareable segment, the shareable segment maps to the address space of that authorized process. Often, no more than one authorized process may mount the shareable segment, other than the initializing process, at any given time.

Other techniques may be used to share data, such as the various data described in the present application, between processes without departing from the scope of geological imaging and inversion using object storage. The processes may be part of the same or different application and may execute on the same or different computing system.

Rather than or in addition to sharing data between processes, the computing system performing one or more embodiments may include functionality to receive data from a user. For example, in one or more embodiments, a user may submit data via a graphical user interface (GUI) on the user device. Data may be submitted via the graphical user interface by a user selecting one or more graphical user interface widgets or inserting text and other data into graphical user interface widgets using a touchpad, a keyboard, a mouse, or any other input device. In response to selecting a particular item, information regarding the particular item may be obtained from persistent or non-persistent storage by the computer processor. Upon selection of the item by the user, the contents of the obtained data regarding the particular item may be displayed on the user device in response to the user's selection.

By way of another example, a request to obtain data regarding the particular item may be sent to a server operatively connected to the user device through a network. For example, the user may select a uniform resource locator (URL) link within a web client of the user device, thereby initiating a Hypertext Transfer Protocol (HTTP) or other protocol request being sent to the network host associated with the URL. In response to the request, the server may extract the data regarding the particular selected item and send the data to the device that initiated the request. Once the user device has received the data regarding the particular item, the contents of the received data regarding the particular item may be displayed on the user device in response to the user's selection. Further to the above example, the data received from the server after selecting the URL link may provide a web page in Hyper Text Markup Language (HTML) that may be rendered by the web client and displayed on the user device.

Once data is obtained, such as by using techniques described above or from storage, the computing system, in performing one or more embodiments, may extract one or more data items from the obtained data. For example, the extraction may be performed as follows by the computing system in FIG. 4.1. First, the organizing pattern (e.g., grammar, schema, layout) of the data is determined, which may be based on one or more of the following: position (e.g., bit or column position, Nth token in a data stream, etc.), attribute (where the attribute is associated with one or more values), or a hierarchical/tree structure (consisting of layers of nodes at different levels of detail—such as in nested packet headers or nested document sections). Then, the raw, unprocessed stream of data symbols is parsed, in the context of the organizing pattern, into a stream (or layered structure) of tokens (where each token may have an associated token "type").

Next, extraction criteria are used to extract one or more data items from the token stream or structure, where the extraction criteria are processed according to the organizing pattern to extract one or more tokens (or nodes from a layered structure). For position-based data, the token(s) at the position(s) identified by the extraction criteria are extracted. For attribute/value-based data, the token(s) and/or node(s) associated with the attribute(s) satisfying the extraction criteria are extracted. For hierarchical/layered data, the token(s) associated with the node(s) matching the extraction criteria are extracted. The extraction criteria may be as simple as an identifier string or may be a query presented to a structured data repository (where the data repository may be organized according to a database schema or data format, such as XML).

The extracted data may be used for further processing by the computing system. For example, the computing system of FIG. 4.1, while performing one or more embodiments, may perform data comparison. Data comparison may be used to compare two or more data values (e.g., A, B). For example, one or more embodiments may determine whether A>B, A=B, A!=B, A<B, etc. The comparison may be performed by submitting A, B, and an opcode specifying an operation related to the comparison into an arithmetic logic unit (ALU) (i.e., circuitry that performs arithmetic and/or bitwise logical operations on the two data values). The ALU outputs the numerical result of the operation and/or one or more status flags related to the numerical result. For example, the status flags may indicate whether the numerical result is a positive number, a negative number, zero, etc. By selecting the proper opcode and then reading the numerical results and/or status flags, the comparison may be executed. For example, in order to determine if A>B, B may be subtracted from A (i.e., A−B), and the status flags may be read to determine if the result is positive (i.e., if A>B, then A−B>0). In one or more embodiments, B may be considered a threshold, and A is deemed to satisfy the threshold if A=B or if A>B, as determined using the ALU. In one or more embodiments, A and B may be vectors, and comparing A with B involves comparing the first element of vector A with the first element of vector B, the second element of vector A with the second element of vector B, etc. In one or more embodiments, if A and B are strings, the binary values of the strings may be compared.

The computing system in FIG. 4.1 may implement and/or be connected to a data repository. For example, one type of data repository is a database. A database is a collection of information configured for ease of data retrieval, modification, re-organization, and deletion. Database Management System (DBMS) is a software application that provides an interface for users to define, create, query, update, or administer databases.

The user, or software application, may submit a statement or query into the DBMS. Then the DBMS interprets the statement. The statement may be a select statement to request information, update statement, create statement, delete statement, etc. Moreover, the statement may include parameters that specify data, or data container (database, table, record, column, view, etc.), identifier(s), conditions (comparison operators), functions (e.g., join, full join, count, average, etc.), sort (e.g., ascending, descending), or others. The DBMS may execute the statement. For example, the DBMS may access a memory buffer, a reference or index a file for reading, writing, deletion, or any combination thereof, for responding to the statement. The DBMS may load the data from persistent or non-persistent storage and perform computations to respond to the query. The DBMS may return the result(s) to the user or software application.

The computing system of FIG. 4.1 may include functionality to present raw and/or processed data, such as results of comparisons and other processing. For example, presenting data may be accomplished through various presenting methods. Specifically, data may be presented through a user interface provided by a computing device. The user interface may include a GUI that displays information on a display device, such as a computer monitor or a touchscreen on a handheld computer device. The GUI may include various GUI widgets that organize what data is shown as well as how data is presented to a user. Furthermore, the GUI may present data directly to the user, e.g., data presented as actual data values through text, or rendered by the computing device into a visual representation of the data, such as through visualizing a data model.

For example, a GUI may first obtain a notification from a software application requesting that a particular data object be presented within the GUI. Next, the GUI may determine a data object type associated with the particular data object, e.g., by obtaining data from a data attribute within the data object that identifies the data object type. Then, the GUI may determine any rules designated for displaying that data object type, e.g., rules specified by a software framework for a data object class or according to any local parameters defined by the GUI for presenting that data object type. Finally, the GUI may obtain data values from the particular data object and render a visual representation of the data values within a display device according to the designated rules for that data object type.

Data may also be presented through various audio methods. In particular, data may be rendered into an audio format and presented as sound through one or more speakers operably connected to a computing device.

Data may also be presented to a user through haptic methods. For example, haptic methods may include vibrations or other physical signals generated by the computing system. For example, data may be presented to a user using a vibration generated by a handheld computer device with a predefined duration and intensity of the vibration to communicate the data.

The above description of functions presents a few examples of functions performed by the computing system of FIG. 4.1 and the nodes and/or client device in FIG. 4.2. Other functions may also be performed using one or more embodiments of geological imaging and inversion using object storage.

While one or more embodiments have been described with respect to a limited number of embodiments, those skilled in the art, having benefit of this disclosure, will appreciate that other embodiments may be devised which do not depart from the scope as disclosed herein. Accordingly, the scope should be limited by no more than the attached claims.

What is claimed is:

1. A computer implemented method of geological imaging using an object store and a processor, the method comprising executing the processor to perform:
hierarchically combining a plurality of prestack images from the object store to generate a hierarchically stacked image, wherein hierarchically combining comprises:
combining, into a first stacked image, a first set of prestack images of the plurality of prestack images;
combining, into a second stacked image, a second set of prestack images of the plurality of prestack images; and
combining the first stacked image and the second stacked image to generate the hierarchically stacked image;
generating a quality measure of a prestack image of the plurality of prestack images by comparing the hierarchically stacked image to the first set of prestack images;
modifying the first set of prestack images using the quality measure to form a filtered first set of prestack images;
regenerating, using the filtered first set of prestack images, the hierarchically stacked image to form an enhanced hierarchically stacked image; and
presenting the enhanced hierarchically stacked image.

2. The method of claim 1, wherein using the object store further stores failure recovery metadata associated with the first stacked image, and wherein the method further comprises:
detecting, during an operation of the geological imaging, a failure of the operation;
identifying a checkpoint that is generated prior to the failure;
repeating, based at least on the checkpoint, the operation of the geological imaging; and
further modifying the first set of prestack images using the failure recovery metadata to form the filtered first set of prestack images.

3. The method of claim 2, wherein the failure recovery metadata comprises at least one selected from a group consisting of an object tag, a checksum, and an object lineage.

4. The method of claim 1, wherein generating the quality measure comprises:
selecting, from a prestack image library acquired based on a plurality of gather parameter values, the plurality of prestack images according to a stochastic algorithm, wherein at least a portion of the plurality of prestack images fails to meet a quality criterion; and
wherein the quality measure identifies the portion of the plurality of prestack images that fails to meet the quality criterion.

5. The method of claim 1, further comprising:
selecting, from a prestack image library acquired based on a plurality of gather parameter values, the plurality of prestack images based on a gather parameter value of the plurality of gather parameter values, wherein at least a portion of the plurality of prestack images fails to meet a quality criterion; and
wherein the quality measure identifies the portion of the plurality of prestack images that fails to meet the quality criterion.

6. The method of claim 5, wherein modifying the first set of prestack images comprises:
modifying, based on a spatial variant weight, the prestack image in the plurality of prestack images.

7. The method of claim 6, wherein the gather parameter value is associated with a seismic acquisition footprint, and wherein failure to meet the quality criterion is due to at least one selected from a group consisting of a coherent noise artifact, an illumination gap artifact, a phase misalignment artifact, and an image multiples artifact.

8. The method of claim 1, further comprising:
generating an earth model using the enhanced hierarchically stacked image; and
improving, using an objective function, the earth model to generate an improved earth model, wherein improving is performed prior to deleting the first set of prestack images from the object store.

9. The method of claim 8, further comprising:
acquiring, using a plurality of sensors in a field, seismic data;
generating, using a seismic migration algorithm, the plurality of prestack images from the seismic data; and
generating, using the improved earth model, a control signal to initiate a field operation in the field.

10. A computer readable medium storing instructions to carry out the method according to claim 1.

11. The method of claim 1, further comprising:
deleting, after regenerating the hierarchically stacked image, at least a subset of the plurality of prestack images from the object store.

12. The method of claim 1, further comprising:
regenerating the first stacked image to form a first enhanced stacked image by combining the filtered first set of prestack images,
wherein regenerating the hierarchically stacked image to form the enhanced hierarchically stacked image comprises combining the first enhanced stacked image and the second stacked image.

13. A system for geological imaging, comprising:
an object store; and
a surface unit communicatively coupled to the object store and comprising a computer processor configured to execute software instructions to perform:
hierarchically combining a plurality of prestack images from the object store to generate a hierarchically stacked image, wherein hierarchically combining comprises:
combining, into a first stacked image, a first set of prestack images of the plurality of prestack images;
combining, into a second stacked image, a second set of prestack images of the plurality of prestack images; and
combining the first stacked image and the second stacked image to generate the hierarchically stacked image;
generating a quality measure of a prestack image of the plurality of prestack images by comparing the hierarchically stacked image to the first set of prestack images;

modifying the first set of prestack images using the quality measure to form a filtered first set of prestack images;

regenerating, using the filtered first set of prestack images, the hierarchically stacked image to form an enhanced hierarchically stacked image; and presenting the enhanced hierarchically stacked image.

14. The system of claim 13, wherein the object store further stores failure recovery metadata associated with the first stacked image, and wherein the computer processor is further configured to execute the software instructions to further perform:

detecting, during an operation of the geological imaging, a failure of the operation;

identifying a checkpoint that is generated prior to the failure;

repeating, based at least on the checkpoint, the operation of the geological imaging; and further modifying the first set of prestack images using the failure recovery metadata to form the filtered first set of prestack images, wherein the failure recovery metadata comprises at least one of an object tag, a checksum, and an object lineage.

15. The system of claim 13, wherein the computer processor is further configured to execute software instructions to generate the quality measure by being further configured to perform:

selecting, from a prestack image library acquired based on a plurality of gather parameter values, the plurality of prestack images according to a stochastic algorithm, wherein at least a portion of the plurality of prestack images fails to meet a quality criterion; and wherein the quality measure identifies the portion of the plurality of prestack images that fails to meet the quality criterion.

16. The system of claim 15, wherein:

modifying comprises modifying the first set of prestack images based on a spatial variant weight, the gather parameter value is associated with a seismic acquisition footprint, and failure to meet the quality criterion is due to at least one of a coherent noise artifact, an illumination gap artifact, a phase misalignment artifact, and an image multiples artifact.

17. The system of claim 13, wherein the computer processor is further configured to execute software instructions to perform:

acquiring, using a plurality of sensors in a field, seismic data;

generating, using a seismic migration algorithm, the plurality of prestack images from the seismic data;

generating, using the enhanced hierarchically stacked image, an earth model;

improving, using an objective function, the earth model to generate an improved earth model, wherein improving is performed prior to deleting the first set of prestack images from the object store; and generating, using the improved earth model, a control signal to initiate a field operation in the field.

18. The system of claim 13, wherein the computer processor is further configured to execute the software instructions to further perform:

deleting, after regenerating the hierarchically stacked image, at least a subset of the plurality of prestack images from the object store.

19. The system of claim 13, wherein the computer processor is further configured to execute the software instructions to further perform:

regenerating the first stacked image to form a first enhanced stacked image by combining the filtered first set of prestack images, wherein regenerating the hierarchically stacked image to form the enhanced hierarchically stacked image comprises combining the first enhanced stacked image and the second stacked image.

* * * * *